US008185139B1

(12) United States Patent
Mangal

(10) Patent No.: US 8,185,139 B1
(45) Date of Patent: *May 22, 2012

(54) PRESENTING MOBILE-DEVICE MESSAGE INFORMATION ON A TELEVISION

(75) Inventor: Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 701 days.

This patent is subject to a terminal disclaimer.

(21) Appl. No.: 11/870,470

(22) Filed: Oct. 11, 2007

(51) Int. Cl.
*H04W 4/00* (2009.01)
*H04M 3/42* (2006.01)
*H04M 3/00* (2006.01)

(52) U.S. Cl. ............... 455/466; 455/417; 455/420

(58) Field of Classification Search .......... 455/3.06, 455/422.1, 426.1, 456.1, 456.3, 466, 556.1, 455/557, 563, 415–420; 379/142.01, 142.04, 379/142.06, 142.07, 93.23, 142.17, 142.15, 379/142.16; 348/14.02, 14.07; 725/131, 725/147, 139, 35, 40, 62, 122, 151, 153
See application file for complete search history.

(56) References Cited

U.S. PATENT DOCUMENTS

| | | | |
|---|---|---|---|
| 5,825,862 A * | 10/1998 | Voit et al. | 379/142.16 |
| 5,920,806 A * | 7/1999 | Gouessant | 455/557 |
| 6,760,415 B2 * | 7/2004 | Beecroft | 379/110.01 |
| 6,831,969 B2 * | 12/2004 | Ju | 379/142.16 |
| 7,010,312 B1 * | 3/2006 | Zechlin | 455/466 |
| 7,197,321 B2 * | 3/2007 | Erskine et al. | 455/456.1 |
| 7,266,834 B1 * | 9/2007 | Lund et al. | 725/47 |
| 7,286,799 B2 * | 10/2007 | Thrasher | 455/41.2 |
| 7,333,820 B2 | 2/2008 | Sheha et al. | |
| 7,536,177 B2 * | 5/2009 | Karaoguz et al. | 455/415 |
| 7,664,239 B2 * | 2/2010 | Groff et al. | 379/93.17 |
| 2001/0029614 A1 * | 10/2001 | Ohgo | 725/109 |
| 2003/0016804 A1 | 1/2003 | Sheha et al. | |
| 2003/0138083 A1 * | 7/2003 | Corbett et al. | 379/93.23 |
| 2003/0190024 A1 * | 10/2003 | Ju | 379/142.16 |
| 2003/0194078 A1 | 10/2003 | Wood et al. | |
| 2004/0091090 A1 * | 5/2004 | Hong et al. | 379/102.03 |
| 2004/0203835 A1 * | 10/2004 | Trottier et al. | 455/454 |
| 2005/0262542 A1 * | 11/2005 | DeWeese et al. | 725/106 |
| 2005/0289622 A1 * | 12/2005 | Vanlerberghe et al. | 725/100 |
| 2006/0025159 A1 * | 2/2006 | Estevez et al. | 455/456.3 |
| 2006/0088149 A1 * | 4/2006 | Sung | 379/142.16 |
| 2006/0166657 A1 | 7/2006 | Patel | |
| 2006/0222152 A1 | 10/2006 | Elias et al. | |

(Continued)

OTHER PUBLICATIONS

Robuck, Mike, "Survey Says: Bring Converged Services," Internet Article, Oct. 2, 2006, 2 pp. Publisher-Cable360.net, Internet Address for article: http://www.cable360.net/ct/video/20019.html.

(Continued)

*Primary Examiner* — Brandon Miller

(57) ABSTRACT

A system and associated methods and media are disclosed for delivering to a user of a display device a notification of an incoming message and a series of interactive options such that the user can provide message-handling instructions to a wireless communications network for the incoming message. The notification and interactive options are transferred to a display device across at least a partially wired network. The message can be text-based or voice-based and can be inserted into a video stream that is communicated from the video-providing component to a media-receiving device that is in communication with the display device. The video-providing component receives message-handling instructions from the media-receiving device, as selected by the user, regarding the incoming message and then transmits the message-handling instructions to the wireless communications network.

13 Claims, 18 Drawing Sheets

U.S. PATENT DOCUMENTS

| | | | |
|---|---|---|---|
| 2007/0036313 A1* | 2/2007 | White et al. | 379/142.17 |
| 2007/0182546 A1* | 8/2007 | Virk et al. | 340/539.13 |
| 2007/0250884 A1* | 10/2007 | Qiu et al. | 725/106 |
| 2007/0263808 A1* | 11/2007 | Van Wyk et al. | 379/142.01 |
| 2008/0125098 A1* | 5/2008 | Bruce et al. | 455/414.1 |
| 2008/0141302 A1 | 6/2008 | Ota | |
| 2009/0025028 A1* | 1/2009 | Cassanova et al. | 725/34 |

OTHER PUBLICATIONS

Van Dusseldorp & Partners, "UK Firm Puts Text Messages on TV.", Publication: EuropeMedia, Jun. 21, 2002, 4 pp., Internet address: http://www.allbusiness.com/technology/technology-services/204759-1.html.

Office Action in U.S. Appl. No. 11/870,112 mailed Sep. 20, 2010.

Time Warner Cable, "Caller ID on TV: Just one more reason to love digital phone," http://www.timewarnercable.com/austin/products/digitalphones/callerid.html.

Office Action in U.S. Appl. No. 11/687,791 mailed Sep. 2, 2010.

Office Action mailed Dec. 15, 2010 in U.S. Appl. No. 11/870,112.

Office Action mailed Feb. 18, 2011 in U.S. Appl. No. 11/870,112.

Final Office Action mailed Feb. 17, 2011 in U.S. Appl. No. 11/687,791.

Notice of Allowance in U.S. Appl. No. 11/870,112 mailed Aug. 11, 2011, 14 pages.

* cited by examiner

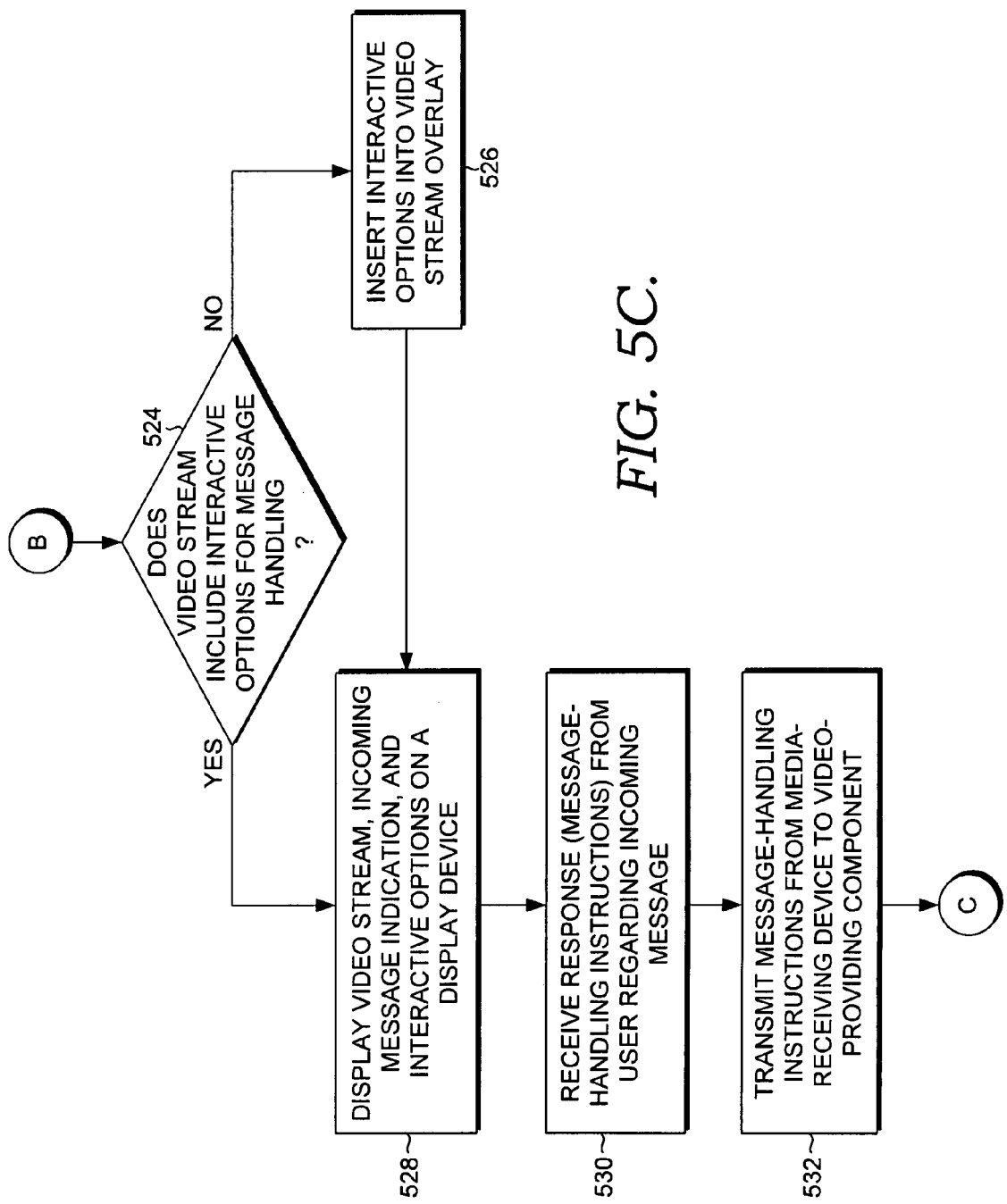

| SEVEN DAY FORECAST | | | | | | CHANNEL 5 |
|---|---|---|---|---|---|---|
| SUN | MON | TUE | WED | THU | FRI | SAT |
| ☀ | ☁ | ⛅ | ⛈ | ⛈ | ☀ | ☀ |
| 85 | 84 | 87 | 82 | 80 | 85 | 89 |
| 68 | 66 | 70 | 65 | 59 | 70 | 72 |

PLEASE ENTER A NEW TELEPHONE NUMBER FOR MESSAGE FROM
(816)555-5555

9 1 3 - 5 5 5 - 8 _ _ _

Ⓐ BACKSPACE   Ⓑ ENTER

*FIG. 8A.*

PRESENTING MOBILE-DEVICE MESSAGE INFORMATION ON A TELEVISION

BRIEF SUMMARY

The invention is defined by the claims below, not by this Summary, which is provided to introduce a selection of concepts in a simplified form that are further described below in the Detailed Description.

The system and methods embodied herein facilitate the delivery of Caller ID information directed to a user's mobile phone (including PDA, and the like) onto the user's home television set for viewing. In particular, the Caller ID information is routed to a particular user's video provider for delivery to the user's home television based on whether a "home" condition is currently valid for the particular user. In such a case, current information about the mobile phone location is utilized to determine if there is an increased probability that the user is at home to view the Caller ID information on their home television.

In one aspect, a method is set forth for selectively providing to a video provider information regarding an incoming call destined for and based on the location of a designated mobile phone associated with a particular user, thereby enabling the video provider to insert the information regarding the incoming call into a video stream for delivery to a video display device associated with the particular user. According to the method, a mobile switching center receives a call from a calling phone, which contains information regarding an identification of the calling phone and a destination number associated with a designated mobile phone. Thereafter, a determination is made as to whether designated mobile phone is within a home zone for the particular user. If in fact the designated mobile phone is determined to be within the home zone, then the calling phone identification and the mobile phone destination number are sent to a video provider associated with the particular user. The video provider can then insert the calling phone identification into the video stream being delivered to the particular user's display device (e.g., the user's home television).

In an alternate embodiment, a way is disclosed for presenting a user of a display device with information associated with an incoming message, such as a text-message or voicemail message, to a user's wireless mobile device across a wireless communications network and prompting the user for message-handling instructions. In this embodiment, a data store in the wireless communications network is consulted to determine the user's profile information, specifically details about a video-providing component and a media-receiving device. When the wireless mobile device is within a proximity of a physical address associated with the user's profile, an indication of an incoming message is shown on the display device associated with the user as well as on the wireless mobile device. This message information is transferred to the display device across a network, in which at least a portion of the network is wired.

In yet another embodiment, a way is provided for transmitting information associated with an incoming message to a wireless mobile device between a video-providing component and the user of a display device that is in communication with the video-providing component. The indication and message information is inserted into a video stream that is transmitted from the video-providing component to a media-receiving device. The video-providing component receives message-handling instructions from the media-receiving device regarding the incoming message and then transmits the message-handling instructions to the wireless communications network. The message handling instructions are a response to interactive options presented to a user of the display device.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

Embodiments of the present invention are described in detail below with reference to the attached drawing figures, which are incorporated by reference, and wherein:

FIGS. 5A, 5B, 5C, and 5D are flow diagrams representative of methods for delivering to a display device an incoming message intended for a user's wireless mobile device according to an embodiment of the present invention;

FIG. 8A is a depiction of a display device on which is depicted a video stream providing yet another set of interactive options to a user for responding to the incoming text-message according to an embodiment of the present invention;

DETAILED DESCRIPTION

The subject matter of embodiments of the present invention are described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Exemplary Operating Environment

Figure 1:
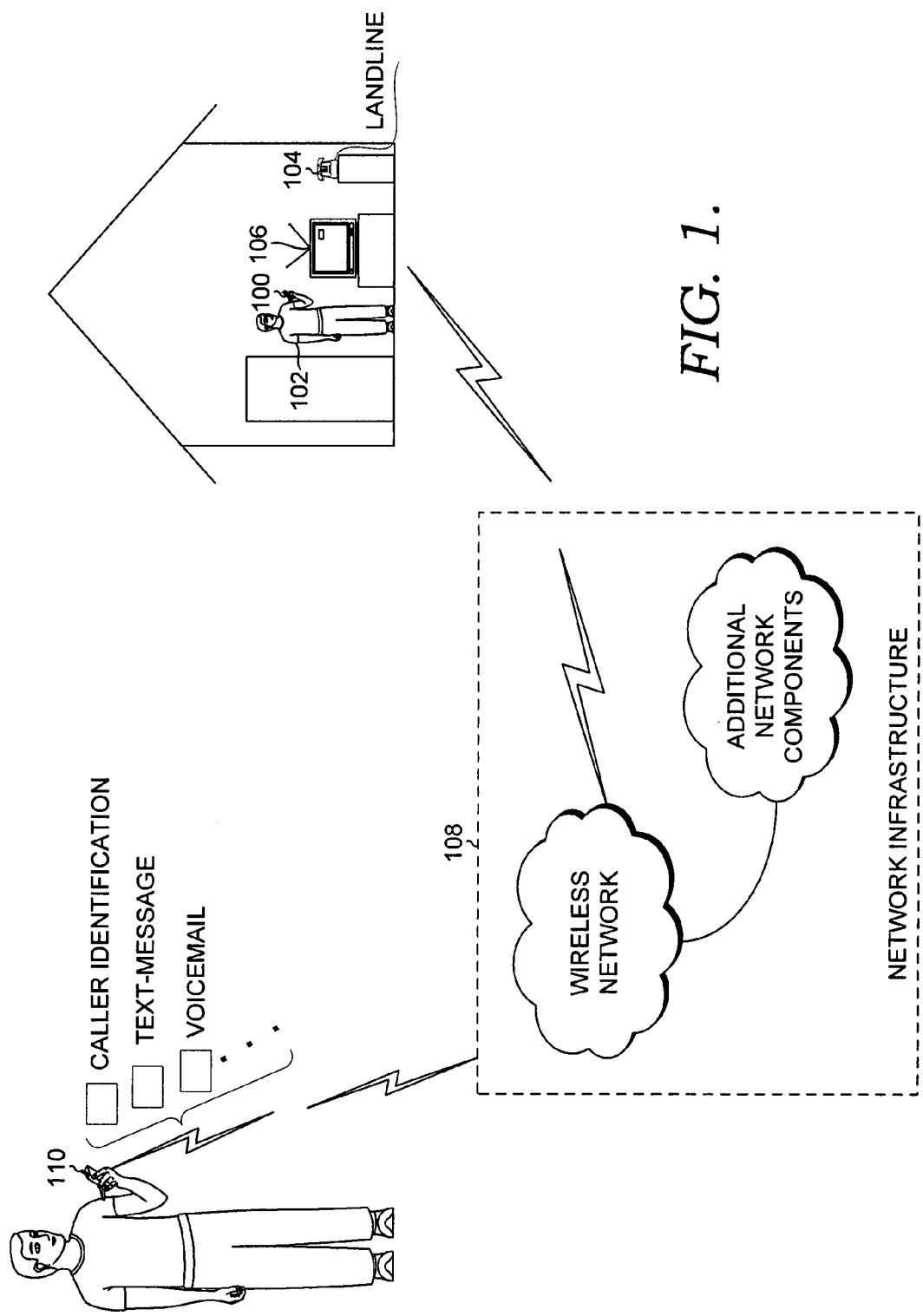
FIG. 1 depicts an environment suitable for use in implementing an embodiment of the present invention.

Referring initially to FIG. 1 in particular, an environment for implementing an embodiment of the present invention is shown. Embodiments of the present invention are directed towards a wireless mobile device 100 and maintaining communication with the user 102 of the wireless mobile device 100 when the device is not immediately within reach of the user 102. In FIG. 1 a user 102 also has access to a landline telephone 104 and a display device 106, such as a television.

The wireless mobile device 100 is in communication with a network infrastructure 108 and uses this infrastructure to communicate with other wireless mobile devices 110. The wireless mobile device 100 can also communicate with the landline telephone 104 or any other landline telephone. Examples of data that can be transmitted across the network infrastructure 108 include caller-identification information, text-message data, and voicemail data. More specific operation will be discussed in detail below.

Figure 2:
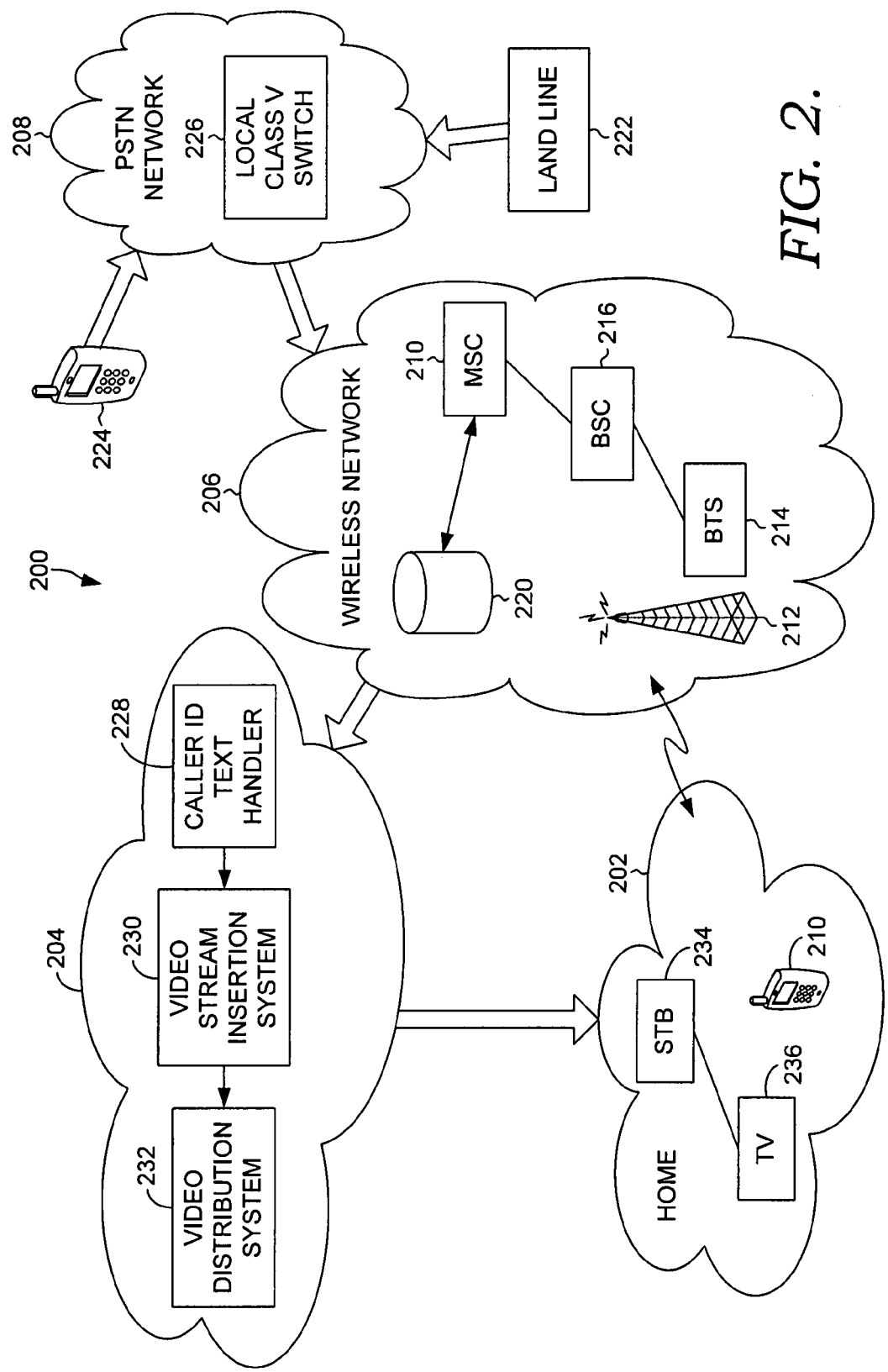
FIG. 2 depicts a system for delivering calling-phone identification information destined for a particular user's mobile phone to the user's home television according to an embodiment of the present invention.

Turning now to FIG. 2, a Caller ID handling system 200 is illustrated for directing calling-phone identification information destined for a particular user's mobile phone to the user's home television. Different portions of the system 200 handling certain functions specified herein include a home portion 202, a video provider portion 204, a telecommunications wireless network portion 206 and a public switched telephone network (PSTN) portion 208.

A particular user's mobile phone 210 is illustrated as being within or at the user's home (residence/dwelling place) in FIG. 2, though it should understood that the mobile phone 210 could be in another location, thereby affecting the outcome of certain activities carried out by an embodiment of the present invention, as explained herein. The boundary of the home portion 202, or "home zone," is explained in further detail herein, but essentially encompasses a region recognized by the system 200 as being associated with the user's physical home or some similar limiting spatial factor. As is known in the art, in a wireless network (such as portion 206), mobile phone 210 sends and receives radio signals through a cell tower 212 having a base transceiver system (BTS) 214, a number of which are typically connected to a base station controller (BSC) 216. The BSC 216 manages the communication between a number of BTSs 214 and a limited number of mobile phones compatible with the wireless network. The BSC 216 connects to a mobile switching center (MSC) 218 acting as a telephone exchange to handle the mobile phone activity through the associated one or more BSCs 216 while connecting as needed to the public switched telephone network (such as PSTN portion 208).

Database 220 is utilized by the MSC 218 to determine current "presence" information for mobile phone 210 users. As explained in further detail herein, one way to establish the user's presence as "home" presence is to determine if the user's mobile phone 210 is currently (or very recently) in communication with the user's assigned home MSC, which is the MSC 218 selected to be geographically closest to the user home or other preestablished location when the user established a home location with a particular wireless telecommunications carrier. The gateway MSC is the MSC 218 that interfaces with the PSTN portion 208, and also determines the MSC assigned to handle a call to the user's mobile phone 210 based on the current location of the user (whether or not it is in fact the home MSC).

PSTN portion 208 handles both land line calls 222 and wireless calls 224 that have reached the PSTN through a wireless network. For instance, incoming calls to the PSTN portion 208 are handled through a local class V switch 226, or equivalent (in hardware or software). Nevertheless, it should be understood that PSTN portion 208 may provide both a circuit-switched network and a packet-switched network, such as for handling some portion of a voice over internet protocol (VoIP) call.

Video provider portion 204 includes a Caller ID text handler 228 for receiving calling-phone identification information from the wireless network portion 206 (which may be routed through another network along the way, such as the PSTN portion 208), a video stream insertion system 230 for taking the calling-phone identification information and inserting the information as data embedded in a video feed or stream being assembled (e.g., as a data packet or "tag" data), and a video distribution system 232 which transmits the assembled video stream to the designated end user's set top box (STB) 234 connected with their home television 236. It should be understood that video streams often include additional types of media, such as audio content. Further, in the context of an embodiment of the present invention, the term "television" refers to any video display device that may be located at a preestablished destination point that the user has conveyed to the video content provider, referred to as the user's "home". In other words, the home television 236 may encompass a traditional television set, a computer with a monitor connected with the STB 234, or any other similar device. Moreover, the functions of a set top box in receiving video streams and handling the associated content for delivery to the home television 236 (e.g., decompressing/demultiplexing the video stream) may be integrated into the home television 236, such that the STB 234 is not a separate device.

As referred to above, the system 200 works to provide Caller ID information destined for a particular user's mobile phone to the user's home television 236 when it is believed that the user is likely home to view it on the television 206. To do this, the MSC 218 determines the presence condition for the user (more particularly, for the user's designated mobile phone 210). This may be done in a number of ways. As one example, if the database 220 has logged quite recently (e.g., in the past few minutes, or sooner) that the mobile phone 210 is in direct communication with the user's home MSC 218, then it is reasonably likely that the user is within or close to their designated home zone. In other words, if the respective BTSs 214 connected with the home MSC 218 are receiving radio signals from the user's mobile phone 210, then the user is considered to be in the "home zone". As a result, there would be at least a considerable chance that the user would be at home to view any Caller ID information on their home television 236 for calls attempting to reach the user's mobile phone 210. The database 220 would then log a "home" condition.

Alternatively, the database 220 (through the MSC 218) could log the GPS coordinates of the mobile phone 210 and periodically compare the coordinates with a preestablished GPS location for the user's home in situations where the mobile phone 210 has a GPS receiver and transmits the determined geolocation to the MSC 218. Upon a match between the coordinates, the database 220 would log the "home" condition. Still further, the wireless network portion 206 could utilize triangulation techniques via a number of BTSs 214 connected with the MSC 218 through the particular BSC 216, to determine a location for the mobile phone 210 (because the location of the cell towers associated with each BTS 214 are known). This would substitute for the GPS coordinates, but otherwise the determination of the "home" condition could be conducted in the same way. It should also be understood that the home MSC 218 for the particular user could store the "home" or "not home" condition in cached memory, to be quickly recalled when the home MSC learns from the gateway MSC that a call is being attempted to user's mobile phone 210 (i.e., for one of the user's associated with the particular MSC.) In any case, the presence condition cached or stored in the database 220 may be determined periodically (e.g., every few seconds, or minutes) in order to save system resources over trying to determine and the presence condition continuously (e.g., every few milliseconds).

Figure 3:
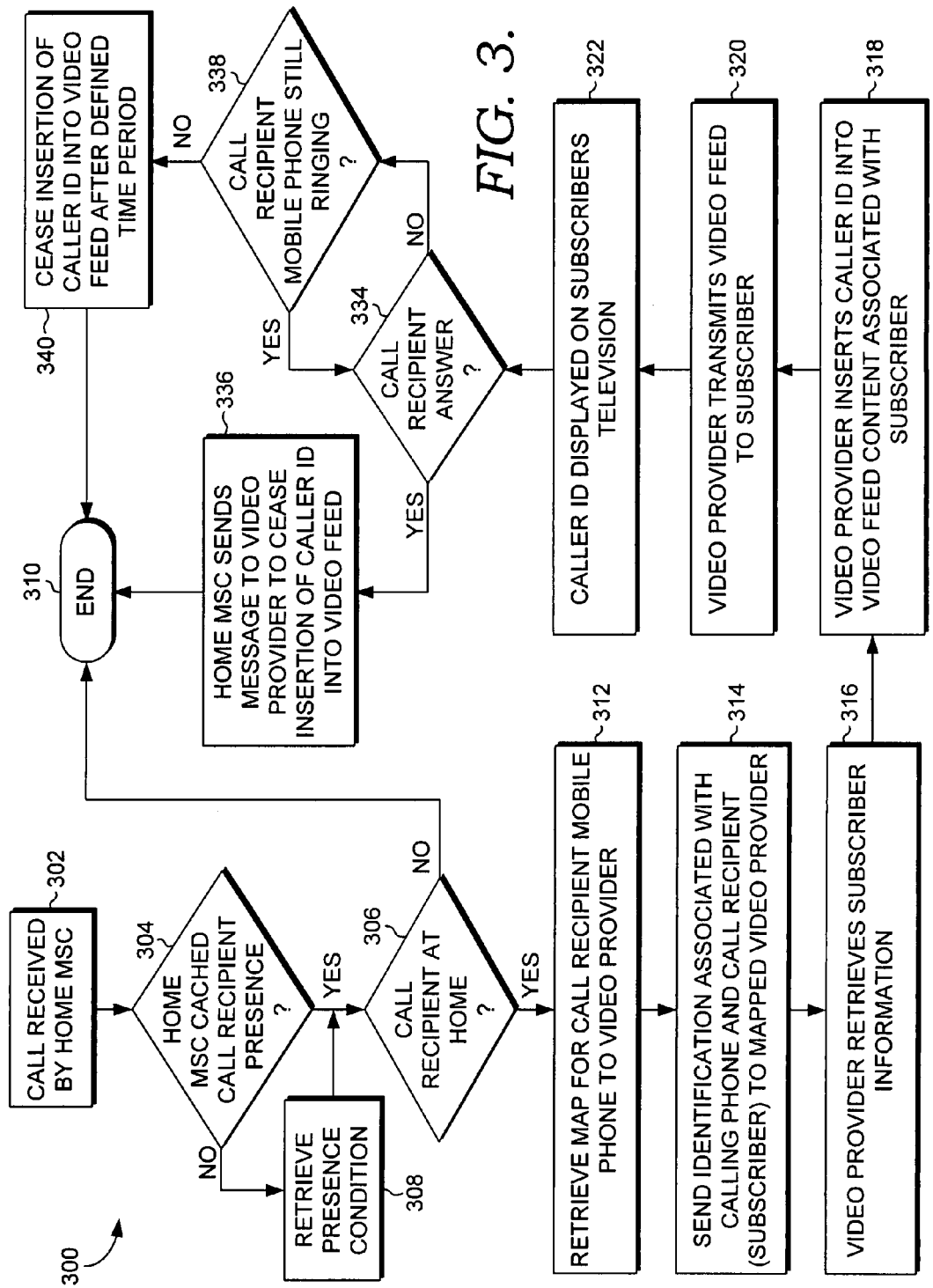
FIG. 3 is a flow diagram representative of a method for delivering calling-phone identification information destined for a particular user's mobile phone to the user's home television according to an embodiment of the present invention.

Continuing with FIG. 3, one method 300 of implementing the features of the system 200 to accomplish delivery of calling-phone identification information destined for a particular user's mobile phone to the user's home television is depicted. It should be understood that prior to implementing the method 300, the user has designated for the wireless network the identity of the user's video provider, such that the wireless network portion 206 knows to communicate the mobile phone 210 user identity and the calling-phone identification information (Caller ID) to a particular video content provider chosen by the user.

At a first step 302 of the method 300, a call is received by the home MSC 218 for the particular mobile phone 210 user. As shown in FIG. 2, the call comes across the PSTN portion 208 from a land line phone or a wireless or mobile phone (or a computer modem acting as a phone for a VoIP call, etc.). The call first reaches the gateway MSC, which contacts the home MSC 218.

A determination is then made in step 304 as to whether the home MSC 218 has cached the call recipient's (i.e., the mobile phone 210 user's) presence condition. If so, then in step 306 the MSC 218 inquires as to whether the call recipient has been recently designated as being home or within the "home zone". Otherwise, if the home MSC 218 has not cached the call recipient's, then in step 308, the MSC 218 retrieves the presence condition from the database 220, and the method continues at step 306.

Returning to step 306, if the call recipient is not at home (i.e., the "not home" condition is currently valid), then there is no need to send the Caller ID information to the user's home television, and thus the method 300 concludes at step 310. Alternatively, if the call recipient is at home (i.e., the "home" condition is currently valid), then in step 312 the "map" or relational chart providing the link between the user's mobile phone number and the video provider associated with that particular user (the user as a subscriber of the video provider's content) is retrieved. This is possible because the incoming call contained the destination number the caller is trying to reach, which is the user's mobile phone number.

Having the mobile phone number to video content provider map, then in step 314, the calling-phone identification information and the user's mobile phone number are sent to the particular video provider (i.e., video provider portion 204). As can be understood, because the video provider has already been furnished with the user's mobile phone number sometime in the past (through authorization of the wireless network to furnish information associated with handled calls to the video provider), the video provider can easily look up the identity of the particular user to receive video content based on the mobile phone number of the same user. Accordingly, in step 316, the video provider portion 204 retrieves the subscriber information, and then in step 318, inserts the calling-phone identification information (or Caller ID) into the video feed content associated with the subscriber/user. In step 320, the video provider transmits or "streams" the video feed to the user at the home portion 202. Finally, in step 322, the Caller ID information is displayed on the mobile phone 210 user's home television 236.

Upon displaying the caller ID information on the user's home television 236, it is determined whether the user, as the call recipient, has answered the call on their mobile phone 210 in step 334. Based on the activity surrounding the setup and actual connection of a voice channel for a call, the home MSC 218 is made aware of whether the call has been answered. If the call has in fact been answered, then in step 336, home MSC 218 sends a command message to the video provider portion 204 to cease insertion of the Caller ID into the video feed for distribution. Thereafter, the method 300 moves to conclusion at step 310.

On the other hand, if the call has not been answered, then it is further determined in step 338 whether the call recipient's mobile phone 210 continues to ring. If the mobile phone 210 continues to ring, then the method 300 returns to step 334 where a determination is made again as to whether the mobile phone 210 user has answered the call. If the call recipient's mobile phone 210 is no longer ringing and a call cannot be completed, then the home MSC 218 informs the video provider portion 204 of this condition in step 340, enabling the video stream insertion system 230 to cease insertion of the Caller ID information into the video feed within a defined period of time (e.g., immediately, after 2 additional seconds, etc.). From step 340, the method 300 moves to conclusion at step 310.

As an alternative, steps 334-340 may be omitted from the method 300 if there is no concern about whether the Caller ID information should be displayed based on the user actually answering their mobile phone 210. It may be desirable, for instance, to merely have display of the Caller ID information (from step 322) for a predetermined amount of time regardless of whether the user actually answer's their mobile phone 210, since the information displayed on the home television 236 typically would only last for a few seconds, and thus would not be very distracting when viewing media content on the television receiving the video feed.

Figure 4:
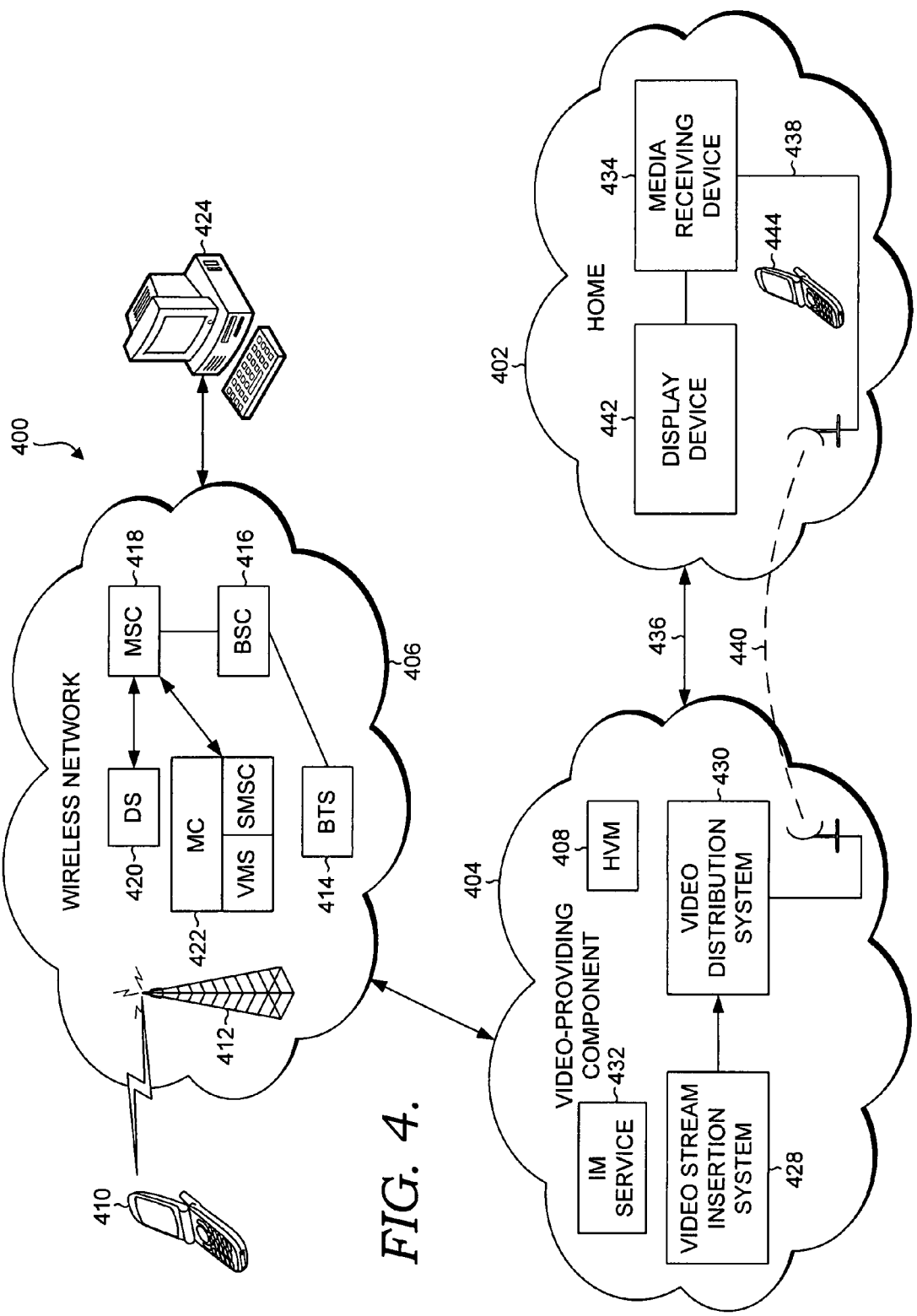
FIG. 4 depicts a system for delivering to a user's display device (such as a TV) an indication of an incoming message bound for the user's wireless mobile device according to an embodiment of the present invention.
Figure 5A:
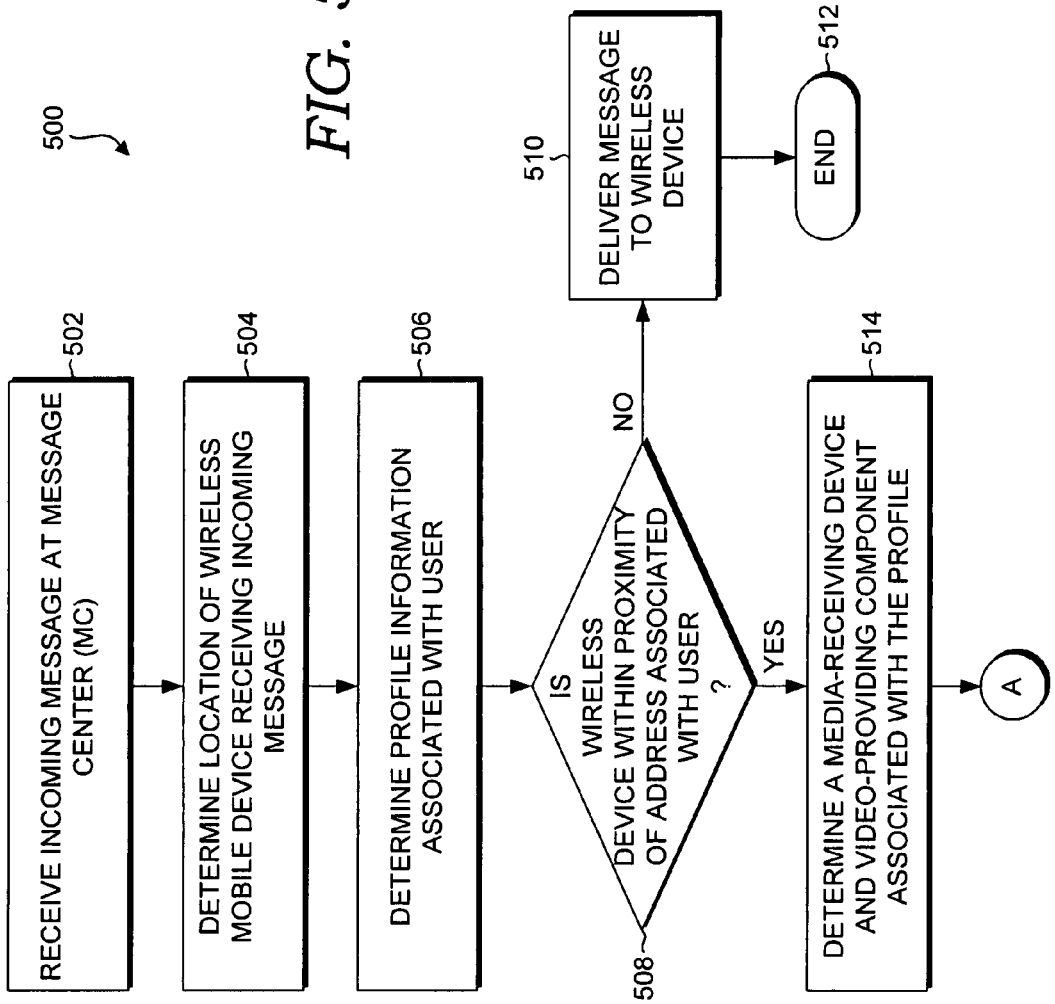
Figure 5B:
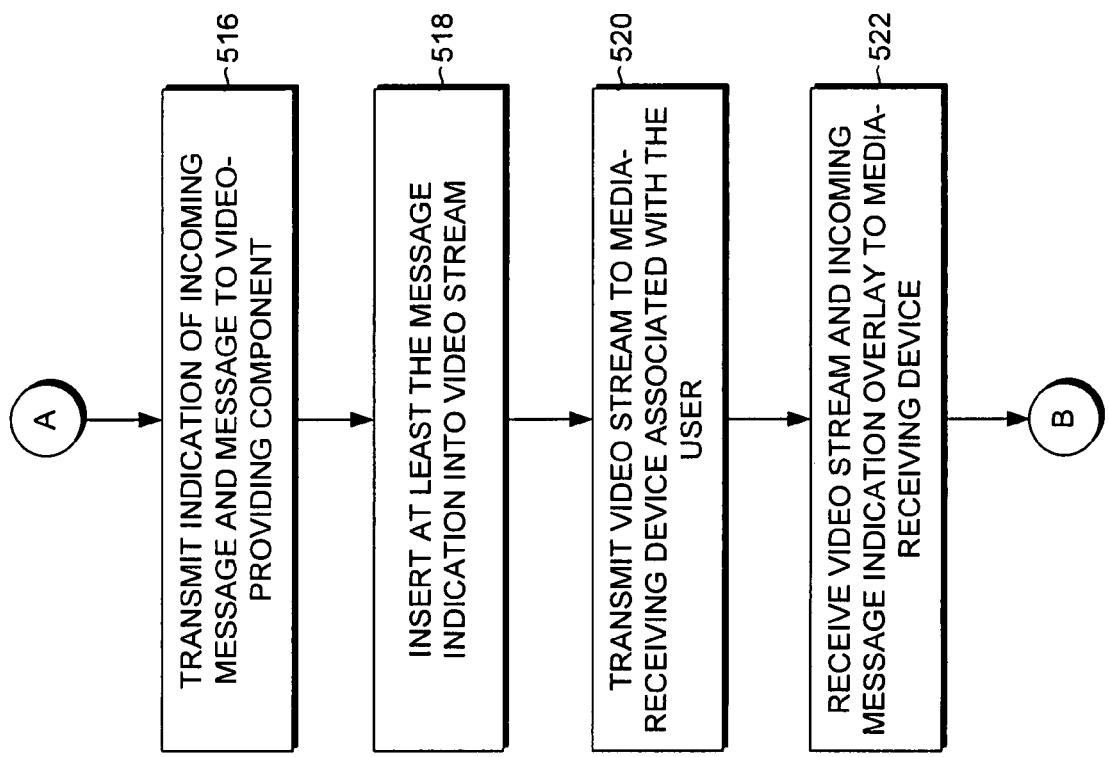
Figure 5D:
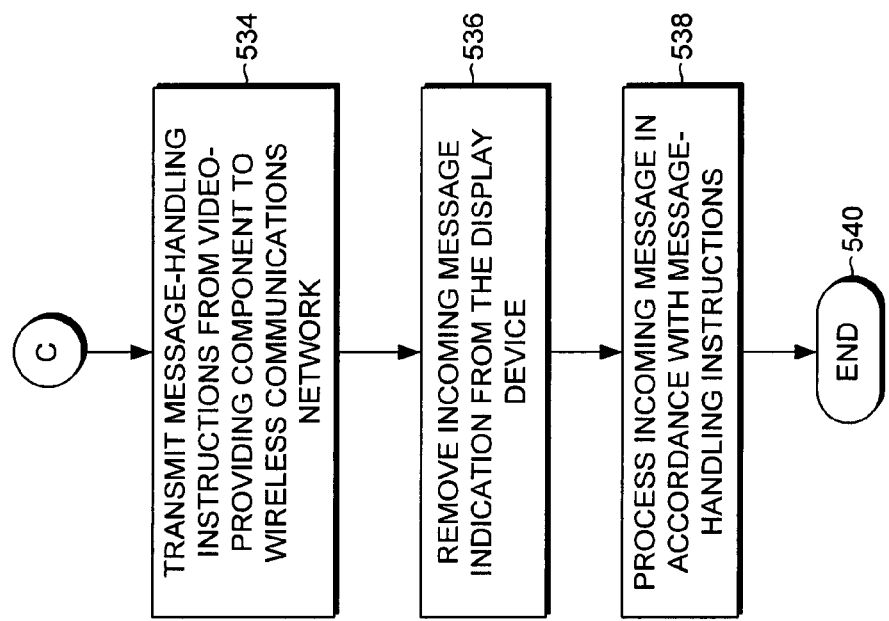

Referring now to FIG. 4, another embodiment of the present invention is depicted. A system 400 for transmitting a message and message-handling instructions across a wireless communications network and video-providing component is depicted. Messages that can be transmitted across the wireless communications network include text-messages and voicemail messages. The system 400 comprises a home portion 402, a video-providing component 404, and a wireless communications network 406. For the embodiment depicted in FIG. 4, two wireless mobile devices 410 and 444 are shown, each capable of sending and receiving messages, with wireless mobile device 444 located within the home portion 402. These wireless devices are comparable to those previously depicted in FIG. 1.

The wireless mobile device 410 (and 444) sends and receives radio signals through at least one tower 412, having a base transceiver system (BTS) 414, which is typically connected to a base station controller (BSC) 416. The BSC 416 manages communication between a number of BTS's 414 and a limited number of wireless mobile devices 410 (and 444) compatible with the wireless communications network 406. The BSC 416 connects to a mobile switching center (MSC) 418, which acts as an exchange to handle wireless mobile device activity through the associated one or more BSC's 416.

In one embodiment, wireless communications network 406 also comprises a data store 420 that contains a set of profile information associated with users of the wireless mobile devices. The profile information in the data store 420 includes a name and address of an account for a user of a wireless mobile device, specifications of the wireless mobile device, video-providing component, and media-receiving device associated with the user.

Also located within the wireless communications network 406 is a message center (MC) 422. The MC 422 is a handling component of the wireless communications network 406 that stores messages (text-based and/or voice-based) and forwards the messages to their respective destinations. The MC 422 stores voicemails in a voicemail system (VMS) and stores text-messages in a short message service center (SMSC). The timeframe for which the messages are stored in the MC 422 can be determined by each user.

The video-providing component 404, which, as an example can be a cable television provider or satellite television provider, comprises at least a video stream insertion system 428 that compiles video content that is to be transmitted to viewers through a video distribution system 430. Often, the video-providing component 404 also provides services to subscribers other than television-related programming. In an embodiment of the invention, the video-providing component 404 can offer online services, which can include instant messaging (IM) programs 432. In an alternate embodiment of the invention, the video-providing component 404 can provide a telephone service and an associated home voicemail (HVM) 408. The telephone service can be a traditional public switched telephone network (PSTN) service as well as telephone service over the Internet, commonly referred to as voice over Internet protocol, or VoIP.

The video stream can be disseminated from the video-providing component 404 to the subscriber using different modes. For example, the video distribution system 430 can send the video stream across a cable network 436 to a media-receiving device 434 that is located within the home portion 402. Alternately, the video stream can be transmitted to the media-receiving device 434 across a partially non-wired pathway such as through a network of satellites 440 and then across a cable network 438 to the media-receiving device 434. Although a media-receiving device 434 is schematically shown in FIG. 4 as a separate component from a display device 442, it should be understood that the media-receiving device 434 could be incorporated within the display device 442. The media-receiving device 434 is a device capable of receiving at least video content for display to a user of a display device, such as a television, monitor, gaming system, or other device capable of displaying a video content.

In the system shown in FIG. 4, the wireless mobile devices 410 and 444 communicate across a wireless communications network 406 and video-providing component 404 to exchange messages. Also, the exchange of messages is not necessarily limited to wireless mobile devices 410 and 444. In an embodiment of the present invention, a computing device 424, such as a desktop or laptop computer can also exchange a message with the wireless mobile device 444 across the wireless communications network 406.

Referring now to FIGS. 5A-5D, an embodiment of the present invention discloses a method of presenting to a user of a display device 442 information that is associated with a message intended for a wireless mobile device 444. The method 500 comprises one or more computer-readable media having computer-executable instructions where, in a step 502, an incoming message that is bound for a wireless mobile device 444 is received at a message switching center (MC) 422. If the message is a voicemail, then an incoming call to the wireless mobile device went unanswered and the caller left a recorded message. The incoming message also includes information identifying the sender of the message. This information can include alphanumeric characters corresponding to a name and phone number associated with the sender. In a step 504, the location of the wireless mobile device 444 receiving the incoming message is determined. This location can be determined by a variety of ways such as through the use of a Global Positioning Satellite (GPS) system and corresponding GPS-receivable tag in the wireless mobile device 444 or through "pinging" the wireless mobile device 444 and determining its location through triangulation from the closest towers 412 accessed by the wireless mobile device 444.

In a step 506, profile information associated with the user of the wireless mobile device 444 is determined from the data store 420. As previously discussed, this profile information includes a user name and address, wireless mobile device specifications, a video-providing component, and a media-receiving device associated with the user. In a step 508, a determination is made as to whether or not the wireless mobile device 444 is located within a specified proximity of the address determined from the data store 420. The proximity may vary depending upon user specification, wireless communications network specifications, or the type of wireless mobile device. For example, a proximity may be set at a certain distance from the user's address (e.g., 100 feet) to account for a situation in which the wireless mobile device is left in a car that is parked in the driveway or on the street adjacent to the address. This proximity can also account for variations in the accuracy of the GPS or other positioning-determination systems or other used to determine the location of the wireless mobile device 444.

If the wireless mobile device 444 is not located within the specified proximity of the address in the user's profile information, then it is determined that the wireless mobile device 444 is not at the user's home portion 402. In a step 510, the incoming message is delivered to the wireless mobile device 444 without an indication of an incoming message being directed to the display device 442. The process then terminates at a step 512.

However, if in the step 508, the wireless mobile device 444 is determined to be within the proximity of the user's address, and in a step 514 a video-providing component and media-receiving device associated with the user are determined from the profile information. As previously discussed the video-providing component may be a cable television or satellite television provider or similar video-streaming entity. The user of a display device 442 is in communication with the video-providing component 404 by way of a media-receiving device 434. This media-receiving device 434 may be a set-top box for receiving a video stream and delivering it to a television or monitor, but may also be an alternate device such as a modem or other receiving device located within the display device 442.

Once the video-providing component 404 and media-receiving device 434 associated with the user have been identified, then in a step 516, the indication of an incoming message (and often times, the message itself) are transmitted to the video-providing component 404 from the wireless network 406. In a step 518, the video-providing component 404 inserts at least the message indication into the video stream and in a step 520, the video-providing component 404 utilizes the video distribution system 430 to transmit the video stream to the media-receiving device 434. The video stream includes an overlay having at least an indication of an incoming message. The transmission, whether by cable, satellite, or other means couples the media-receiving device 434 to the wireless communications network 406 by way of at least a portion of a cable network 436 and/or 438, which provides a wired pathway to the media-receiving device 434 for communicating the message.

In a step 522, the video stream and incoming message overlay are received by the media-receiving device 434 while in a step 524, a determination is made as to whether or not the video stream includes interactive options for handling the message. Depending on the video-providing component 404, the interactive options may be inserted into the video stream by the media-receiving device 434 or earlier in the stream by the video-providing component 404. If the interactive options are not transmitted with the video stream from the video-providing component 404, then according to step 526, the interactive options are inserted into the video stream by the media-receiving device 434.

In an embodiment of the invention the message is a text-message comprising one or more alphanumeric characters. More specifically, the message may be a single character, such as a symbol or number, or a series of characters that together form a word or phrase. The interactive options provided enable a user of the display device 442 to respond to the incoming text-message to the wireless mobile device 444. The interactive options provide message-handling instructions to the video-providing component 404 and the wireless communications network 406. Examples of message-handling instructions for this embodiment include directing the incoming text-message to a text-message mailbox (SMSC portion of MC 422) associated with the wireless mobile device 444, to an alternate wireless mobile device, to an instant message (IM) service 432 associated with an Internet service provided by the video-providing component 404, or to an alternate IM service.

In an alternate embodiment of the invention the message is a voicemail message comprising a series of words or phrases that are digitally recorded to a memory device by a caller. The interactive options provided enable a user of the display device 442 to respond to the incoming voicemail to the wireless mobile device 444. The interactive options provide voicemail-handling instructions to the video-providing component 404 and the wireless communications network 406. Examples of voicemail-handling instructions include directing the incoming voicemail to an alternate wireless voicemail mailbox, to a home-based voicemail, or to play the voicemail.

In a step 528, the video stream, incoming message indication, and interactive options are shown on the display device 442. In a step 530, the media-receiving device 434 receives a response, in the form of selecting a set of message-handling instructions, from the user regarding the incoming message. The message-handling instructions are then transmitted from the media-receiving device 434 to the video-providing component 404 in a step 532. Then, in a step 534, the message-handling instructions are transmitted from the video-providing component 404 to the wireless communications network 406.

In a step 536, the message indication and interactive options are removed from the display device. The incoming message indication can be removed by either the media-receiving device 434 or the video-providing component 404, depending upon operational preferences of the video-providing component 404. The incoming message to the wireless mobile device 444 is then processed in accordance with the message-handling instructions in a step 538 and the process terminates at a step 540.

In a variation to an embodiment of the present invention, the interactive options can be provided to the user audibly through a speaker in the display device 442. The audible speech is generated by a speech module located in either the media-receiving device 434 or the display device 442. Furthermore, the message-handling instructions can be provided audibly by the user, and through a speech recognition module in the media-receiving device 434 or display device 442, can be converted into computer-executable instructions understood by the video-providing component 404 and wireless communications network 406.

Figure 6A:
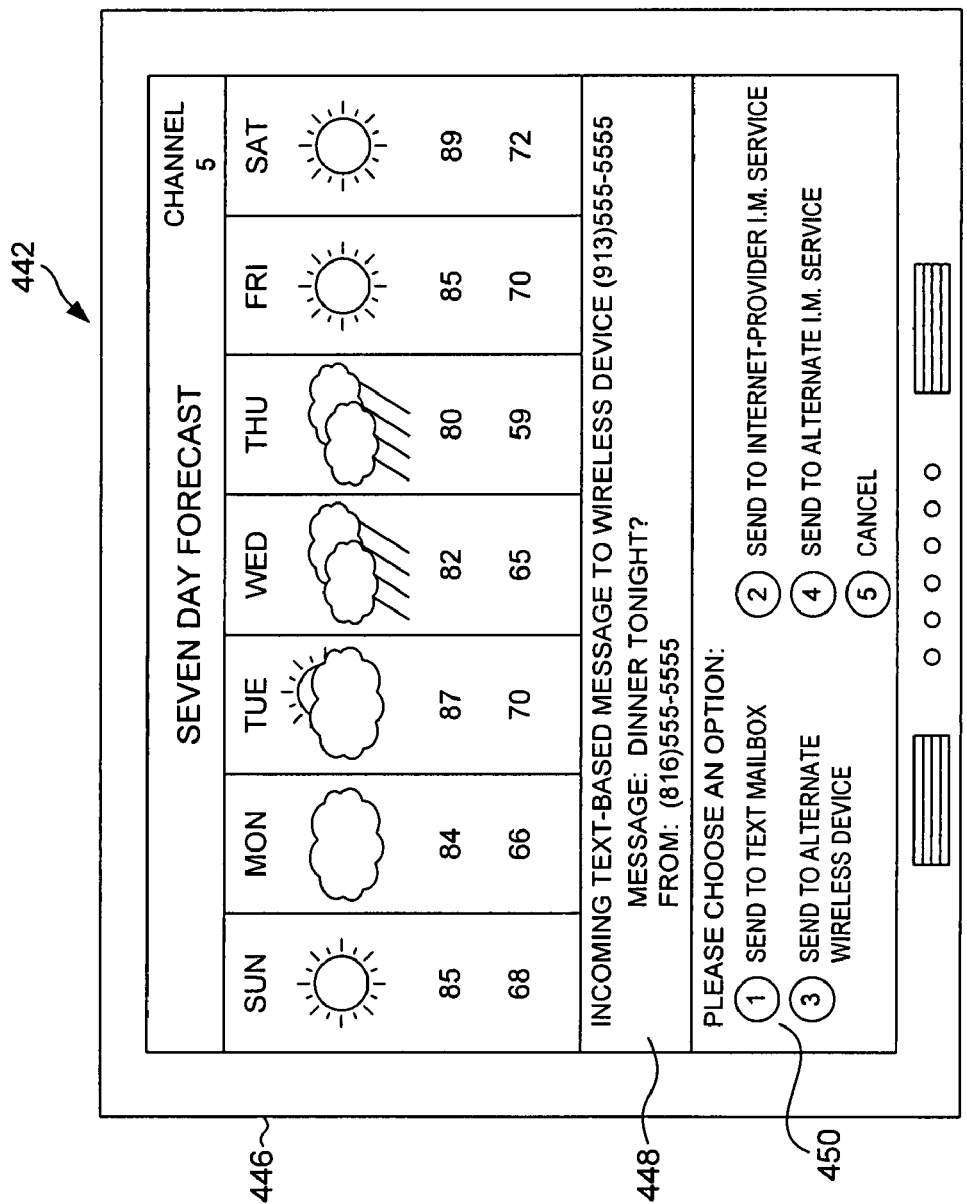
FIG. 6A is a depiction of a display device on which is depicted a video stream indicating an incoming text-message and providing a set of interactive options to a user for responding to the incoming text-message according to an embodiment of the present invention.

Referring now to FIG. 6A, a display device 442 is depicted including an incoming message 448 corresponding to a text-message and a series of interactive options 450 that are together overlaid on a video stream shown on the screen 446. For example, the incoming message 448 shown in FIG. 6A states that there is an incoming text-message to a wireless mobile device having the telephone number (913) 555-5555 from a wireless device having the telephone number (816) 555-5555 with the message text reading "Dinner tonight?". Listed beneath the message 448 is a series of interactive options 450. These options permit the user of the display device 442 to choose to 1) send the incoming text-message to a text mailbox associated with the wireless device, 2) send the incoming text-message to an IM service associated with the user's Internet provider, 3) send the incoming text-message to an alternate wireless device, 4) send the incoming text-message to an alternate IM service, or 5) cancel the display of the incoming text-message.

Figure 7A:
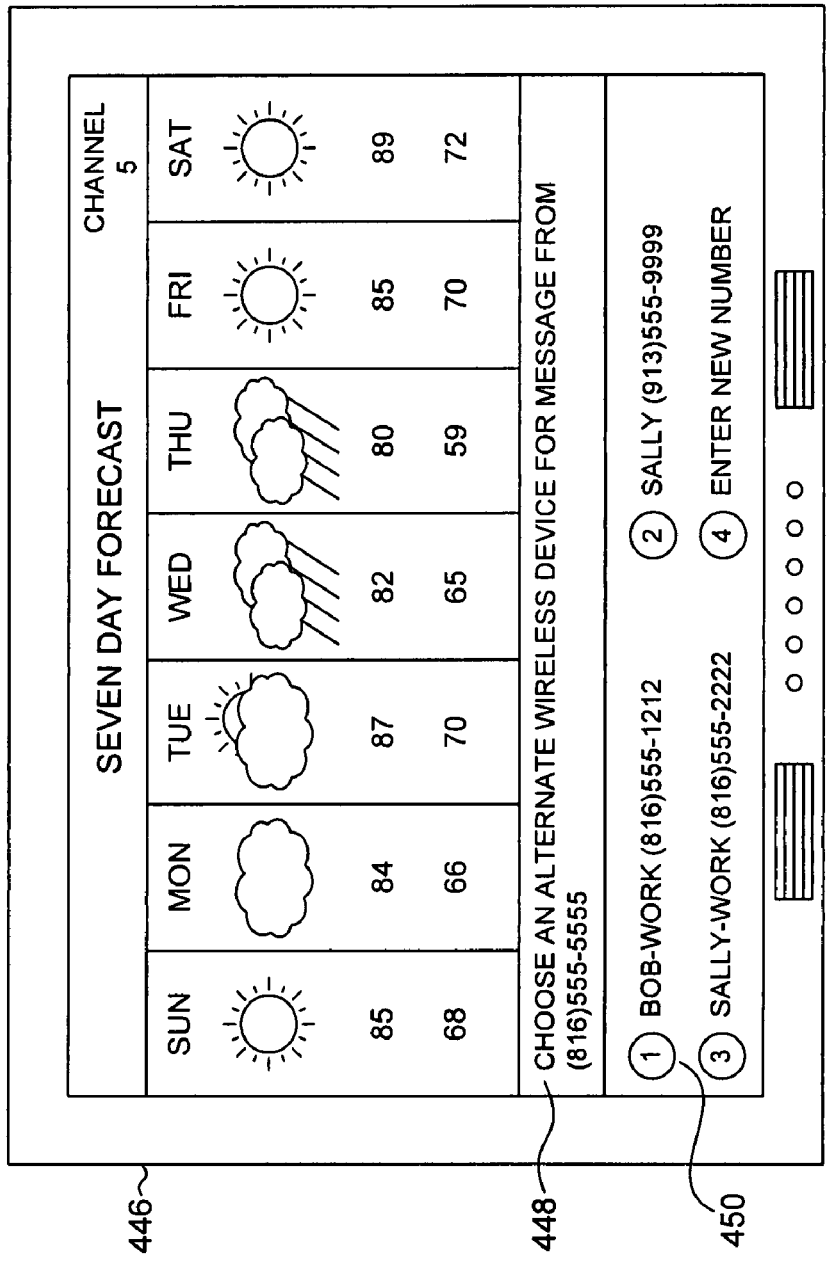
FIG. 7A is a depiction of a display device on which is depicted a video stream providing an alternate set of interactive options to a user for responding to the incoming text-message according to an embodiment of the present invention.
Figure 8B:
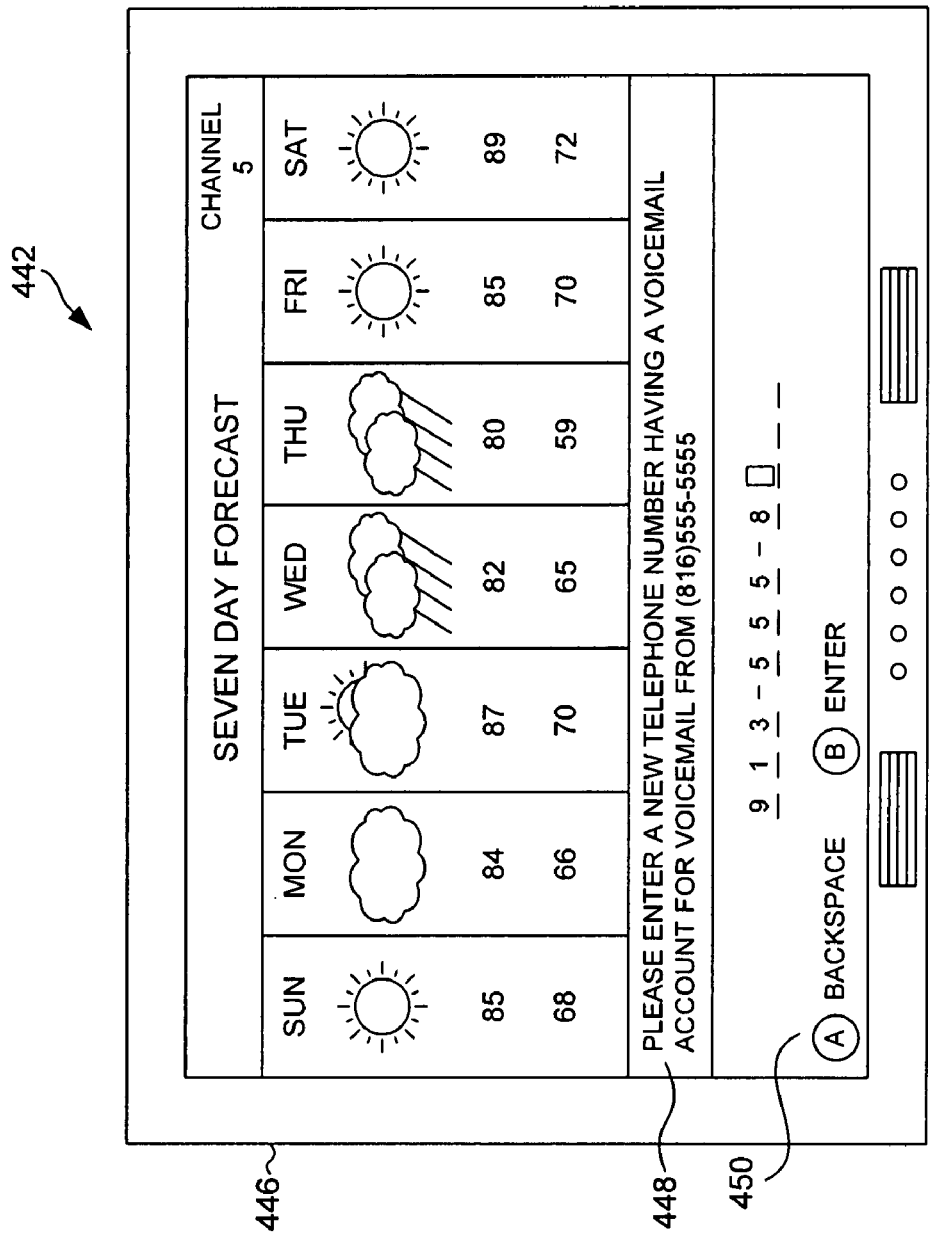
FIG. 8B is a depiction of a display device on which is depicted a video stream providing yet another set of interactive options to a user for responding to the incoming voicemail message according to an embodiment of the present invention.
Figure 9:
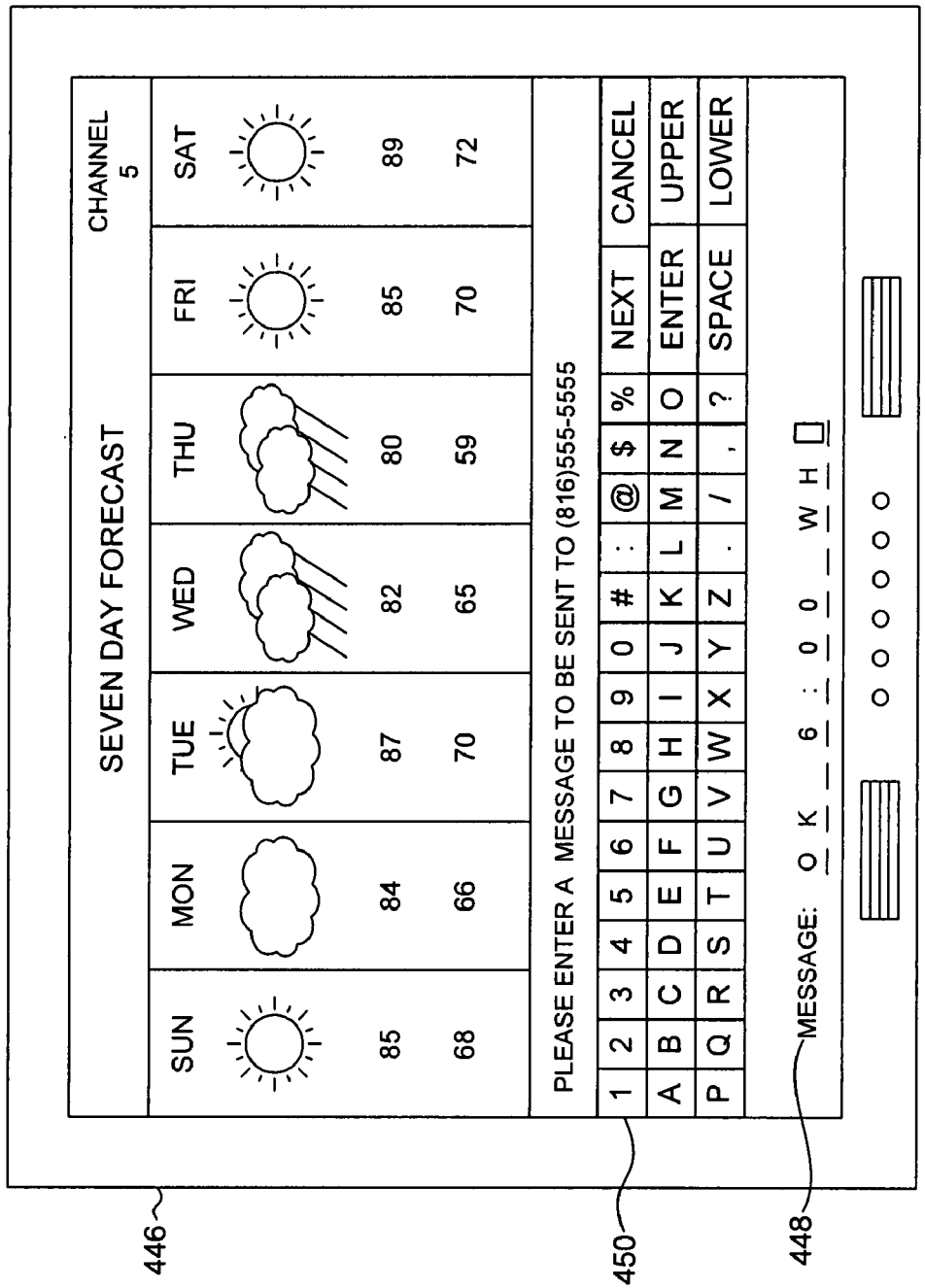
FIG. 9 is a depiction of a display device on which is depicted a video stream and still another set of interactive options to a user for responding to the incoming text-message according to an embodiment of the present invention.

In the event that the user chooses option 3) (alternate wireless device) in FIG. 6A, then the interactive options 450 are revised and the user is presented with a series of telephone numbers corresponding to alternate wireless devices capable of sending and receiving text-messages (see FIG. 7A). For example, the user can choose to send the incoming text-message to a pre-programmed wireless mobile device (interactive options 1-3 in FIG. 7A), or to enter a specific telephone number corresponding to an alternate wireless mobile device (option 4). If the user selects option 4 on this screen, then, the interactive options 450 change and the user is prompted to enter a telephone number (or other identifying means) of the device to which the text-message is to be sent, as shown in FIG. 8A. Typically, the responses to the interactive options are supplied by the user through a remote control to the media-receiving device 434 or display device 442. Depending on user preferences, display device capability, and video-providing component capabilities, the interactive options 450 can include a modified keyboard displayed on the screen 446 of the display device 442. Such an arrangement, which is depicted in FIG. 9, allows the user to select both alphabetical and numerical characters when preparing a reply to the text-message.

Figure 10:
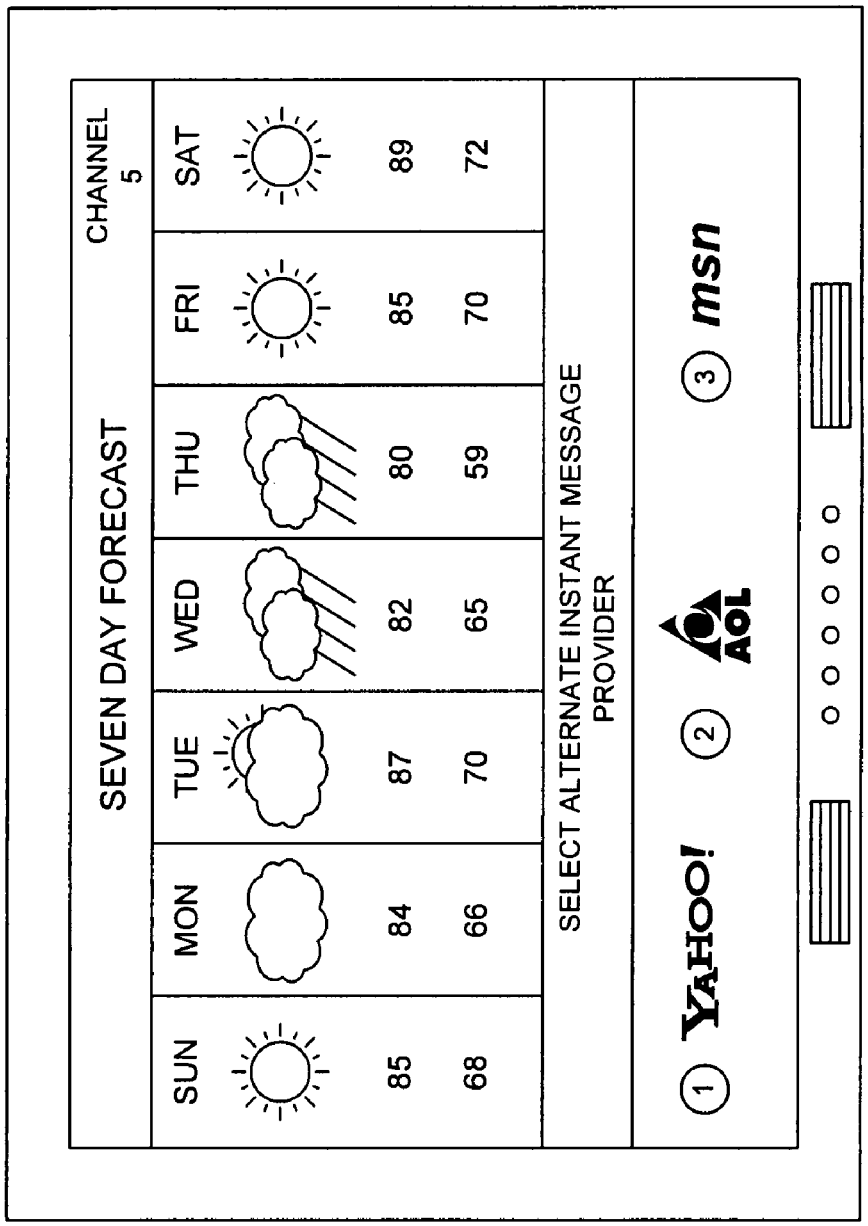
FIG. 10 is a depiction of a display device on which is depicted a video stream and an alternate set of interactive options to a user for responding to the incoming text-message according to an embodiment of the present invention.

Referring back to FIG. 6A, in the event the user selects option 4) from the list of interactive options 450, then these options are replaced with a series of alternate, but commonly used, instant message providers. An example of this display is depicted in FIG. 10. Once the user chooses one of the providers listed, the user is then prompted to enter information relating to the intended recipient of the text-message. If the user selects option 5) from the initial list of interactive options 450 depicted in FIG. 6A, then the message 448 and interactive options 450 will be cleared from the screen 446.

Figure 11A:
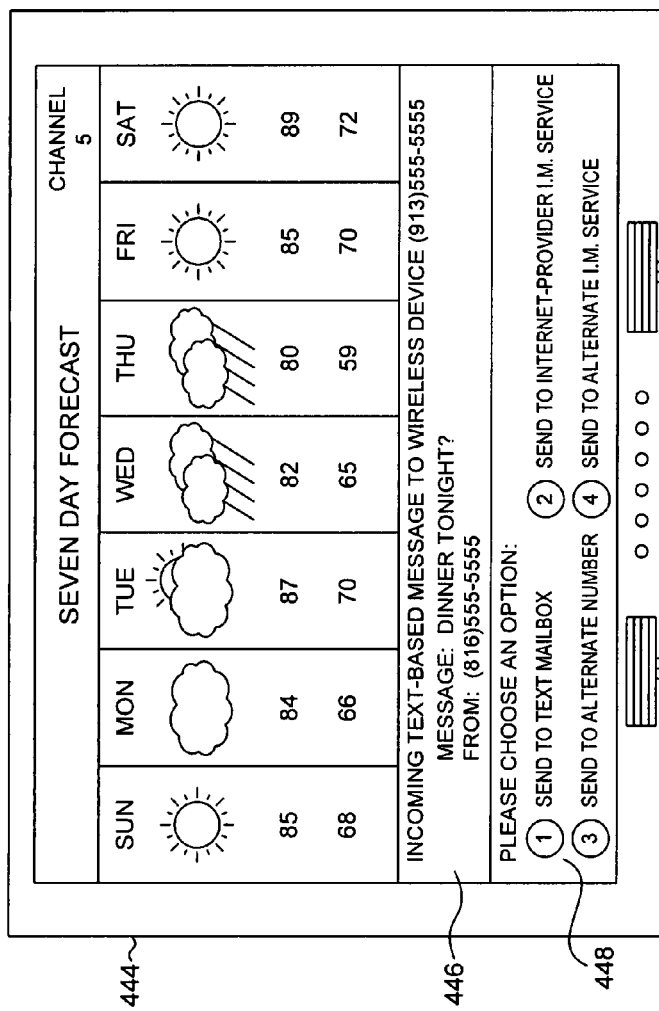
FIG. 11A is a depiction of a display device on which is depicted a video stream indicating an incoming text-message visually and audibly according to an embodiment of the present invention; and, FIG. 11B is a depiction of a display device on which is depicted a video stream indicating an incoming voicemail message visually and audibly according to an embodiment of the present invention.

As previously discussed, the incoming text-message and interactive call options, can also be presented audibly. An example of such a configuration is shown in FIG. 11A. In this embodiment, the user can also provide an audible response to the audible prompt or the user can enter a response to the audible prompt as previously discussed.

It is important to note that even while the text-message is being transmitted to the display device, the attempted delivery of the text-message to the wireless mobile device is not interrupted. In fact, the wireless communications network still attempts to complete the text-message delivery while simultaneously notifying the user through the display device.

Figure 6B:
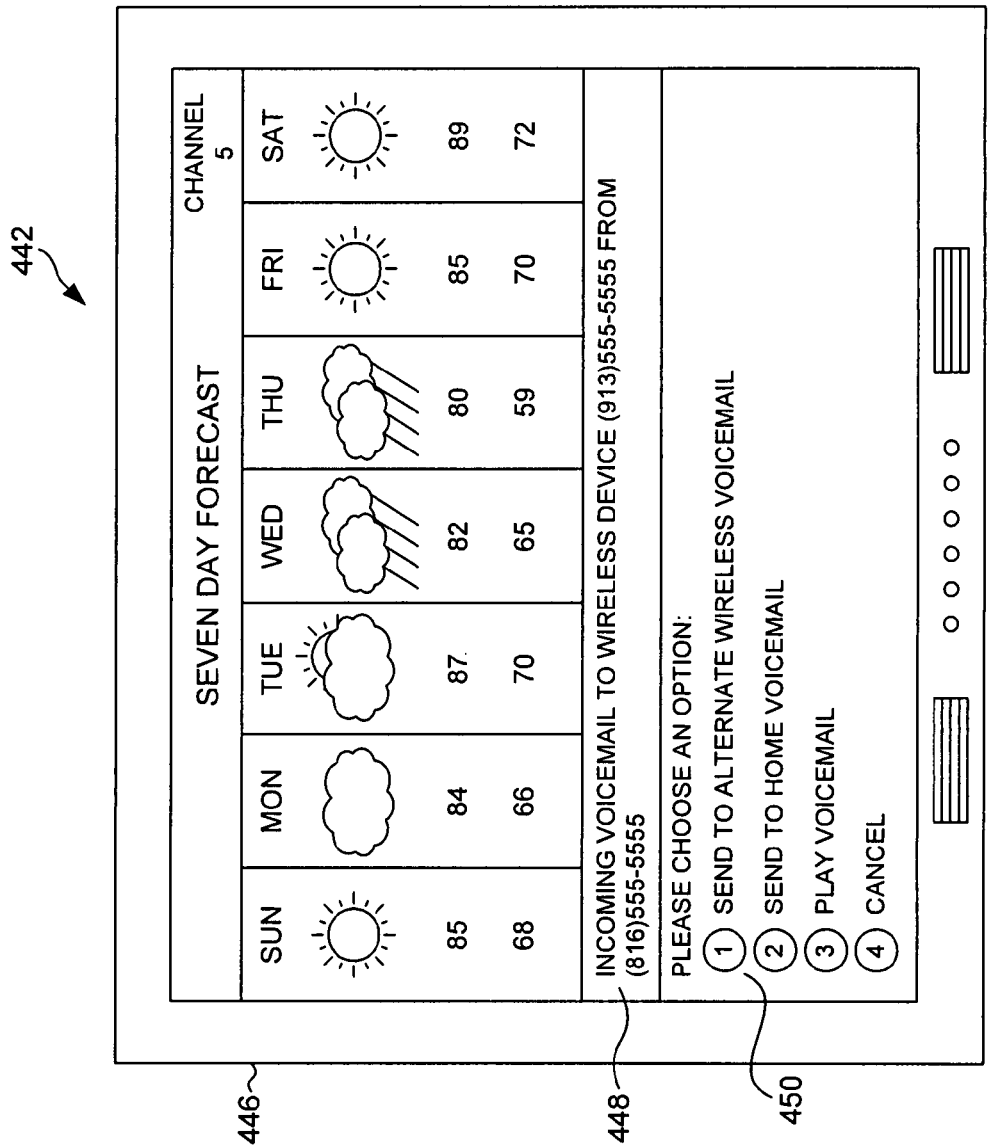
FIG. 6B is a depiction of a display device on which is depicted a video stream indicating an incoming voicemail message and providing a set of interactive options to a user for responding to the incoming voicemail message according to an embodiment of the present invention.

Referring now to FIG. 6B, a display device 442 is depicted including an indication 448 of an incoming voicemail message and a series of interactive options 450 that are together overlaid on a screen 446. For example, the indication of an incoming voicemail message 448 shown in FIG. 6B states that there is a voicemail to a wireless mobile device having the telephone number (913) 555-5555 from a telephone number (816) 555-5555. Listed beneath the voicemail indication 448 is a series of interactive options 450. These options permit the user of the display device 442 to choose to 1) send the incoming voicemail to a voicemail associated with an alternate wireless device, 2) send the incoming voicemail to a voicemail associated with the user's home phone provider, 3) to play the voicemail, or 4) to cancel the indication.

Figure 7B:
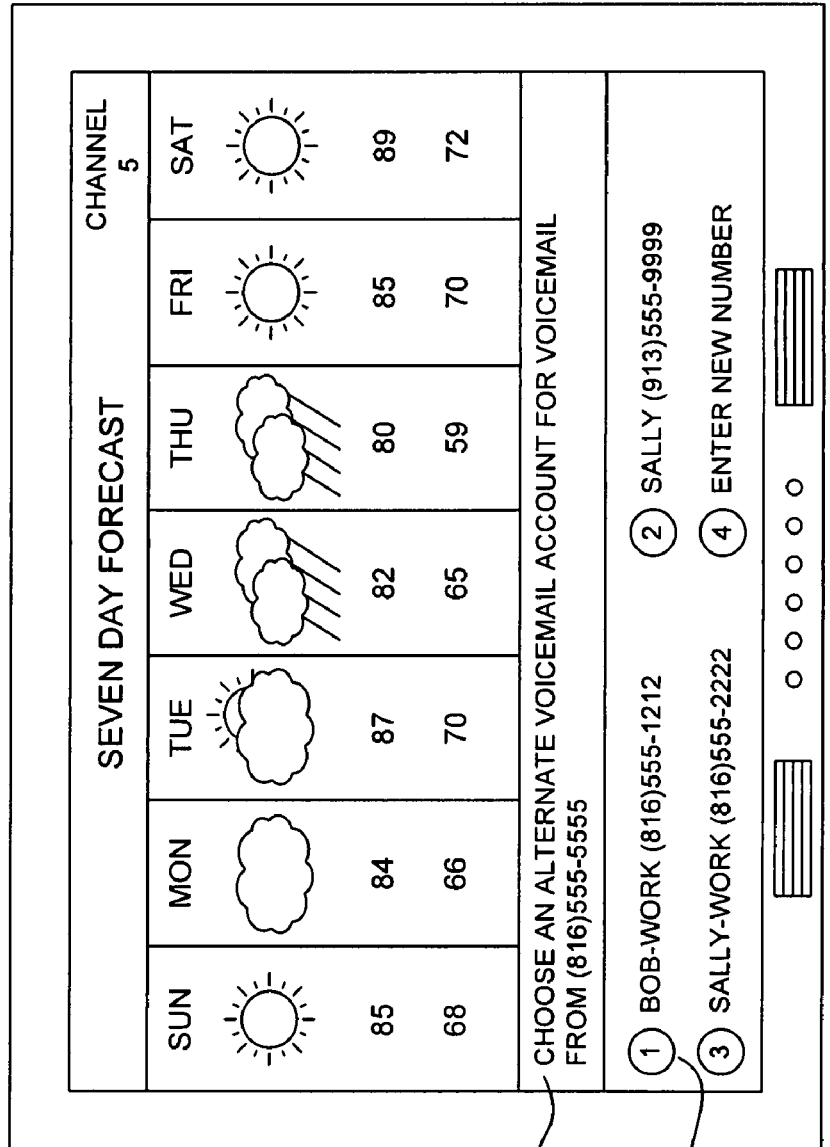
FIG. 7B is a depiction of a display device on which is depicted a video stream providing an alternate set of interactive options to a user for responding to the incoming voicemail message according to an embodiment of the present invention.

In the event that the user chooses option 1) (voicemail associated with a wireless mobile device) from FIG. 6B, then the interactive options 450 are revised as depicted in FIG. 7B, and the user is presented with a series of telephone numbers corresponding to alternate wireless mobile devices capable of receiving voicemail messages. For example, the user can choose to send the incoming voicemail to a pre-programmed telephone number (interactive options 1-3 in FIG. 7B), or to enter a specific telephone number (option 4), which may or may not correspond to an alternate wireless mobile device. If the user selects option 4 on this screen, then, the interactive options 450 change again and the user is prompted to enter a telephone number (or other identifying means) of the device to which the voicemail message is to be sent, as shown in FIG. 8B. Typically, the responses to the interactive options are supplied by the user through a remote control to the media-receiving device 434 or display device 442.

Referring back to FIG. 6B, if the user selects option 2), then the incoming voicemail is routed to the voicemail service associated with the user's home telephone service (HVM 408), which as previously discussed, is typically provided by the video-providing component 404. If the user selects option 3) from the display in FIG. 6B, then the voicemail message is projected to the user through an audio playback component of the display device 442 and/or video-providing component 434. An example of such a configuration is shown in FIG. 9. In this embodiment, the user can also provide an audible response to the audible prompt or the user can enter a response to the audible prompt as previously discussed. Once the voicemail has been played, the user is provided with prompts typical of known voicemail delivery systems, such as to delete the voicemail, replay the voicemail, forward the voicemail, or store the voicemail. Finally, the user can select to cancel the notification by selecting by selecting option 4), thereby effectively ignoring the notification of the incoming voicemail and clearing the display. Also, if the user ignores the notification, and does not select option 4), then the notification 448 times out and the display is removed from the video stream.

Figure 11B:
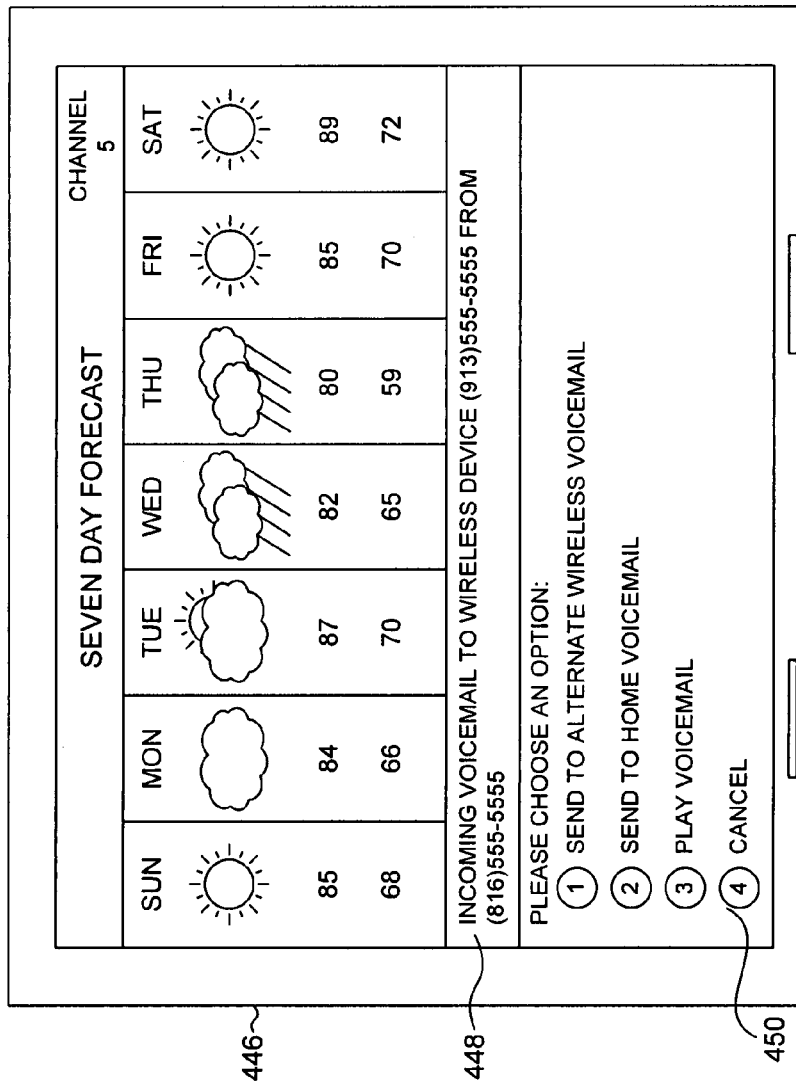

As previously discussed, the incoming voicemail-message and interactive call options, can also be presented audibly. An example of such a configuration is shown in FIG. 11B. In this embodiment, the user can also provide an audible response to the audible prompt or the user can enter a response to the audible prompt as previously discussed.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more non-transitory computer-readable media having computer-executable instructions embodied thereon for performing a method of presenting to a user a text-based message on a display device, said text-based message being associated with a wireless mobile device that is capable of receiving messages through a wireless communications network, the method comprising:
   receiving an indication of said text-based message that is attempting to be communicated to said wireless mobile device and that is intended to be received by said user, wherein said text-based message is transferred through at least a message center of the wireless communications network;
   referencing a data store of said wireless communications network to determine profile information associated with said user;
   upon determining a location of said wireless mobile device to be in a home condition, determining from said profile information a media-receiving device and a video-providing component that is associated with said user; and
   communicating said text-based message from said video-providing component to said media-receiving device, wherein the media-receiving device is responsible for presenting content of the text-based message on a display device operable coupled to the media-receiving device.

2. The media of claim 1, wherein said text-based message is a text-message or a voicemail message.

3. The media of claim 2, wherein said text-message comprises a data file having one or more alphanumeric characters or symbols and said voicemail message comprises an audio file of a caller's recorded voice.

4. The media of claim 1, wherein said profile information comprises at least identification of a video-providing component and media-receiving device associated with said user and a physical address associated with said user.

5. The media of claim 1, further comprising receiving message-handling instructions from said media-receiving device.

6. One or more non-transitory computer-readable media having computer-executable instructions embodied thereon for performing a method of transmitting message information intended for a wireless mobile device to a video-providing component and a display device associated with a user of said wireless mobile device comprising:
- upon determining said wireless mobile device to be in a home condition, receiving at said video-providing component at least an indication of an incoming message;
- inserting said indication of said incoming message into a video stream at said video-providing component;
- inserting at least a portion of content of said incoming message into the video stream at said video-providing component;
- communicating said video stream from said video-providing component to a media-receiving device, wherein said video stream is capable of being presented on said display device such that the indication of the incoming message and the content of the incoming message is visible to the user of the wireless mobile device;
- receiving message-handling instructions at said video-providing component from said media-receiving device regarding the content of said incoming message, wherein the message-handling instructions are generated upon the user selecting interaction options, which are displayed on the display device, configured to assist the user in preparing a reply to the incoming message; and
- transmitting said message-handling instructions from said video-providing component to a wireless communications network.

7. The media of claim 6, wherein said video stream further comprises the interactive options from which said user selects said message-handling instructions.

8. The media of claim 7, wherein said message-handling instructions are further configured to direct said incoming message to a text-based mailbox associated with said wireless mobile device, an alternate wireless mobile device, an instant message service associated with said video-providing component, or an alternate instant message service.

9. The media of claim 7 wherein said message-handling instructions are further configured to direct a voicemail to a voicemail account associated with an alternate wireless mobile device, a voicemail account associated with a home-based telephone, or to play said voicemail to said user through said display device.

10. The media of claim 6, further comprising one or more interactive options provided audibly to said user through a speaker in said display device and said message-handling instructions are received audibly from said user through a speech recognition module embodied within said display device or said media-receiving device.

11. The media of claim 6 wherein said incoming message is a text-message or a voicemail message.

12. The media of claim 7, further comprising removing said message information and said interactive options from said video stream upon receipt of said message-handling instructions.

13. One or more non-transitory computer-readable media having computer-executable instructions embodied thereon for performing a method of presenting to a user a text-based message on a display device, said text-based message being associated with a wireless mobile device that is capable of receiving messages through a wireless communications network, the method comprising:
- receiving an indication of said text-based message that is attempting to be communicated to said wireless mobile device and that is intended to be received by said user, wherein said message is transferred through at least a message center of the wireless communications network;
- referencing a map accessible by the wireless communications network to determine a video provider associated with the user, wherein the map acts as a relational chart that provides a link between a phone number of the user's wireless mobile device targeted by the text-based message and the user's video provider;
- when a location of said wireless mobile device is determined to be in a home condition, determining from said map the associated video provider;
- communicating to the video provider information regarding the text-based message, an identifier of a source of the text-based message, and an identifier of the user's wireless mobile device, wherein the video provider selects a media-receiving device that is associated with the user via the identifier of the user's wireless mobile device and inserts the information regarding the text-based message and the identifier of the source of the text-based message within a video stream directed to the media-receiving device.

* * * * *